(12) United States Patent
Yang

(10) Patent No.: US 7,375,954 B2
(45) Date of Patent: May 20, 2008

(54) COMPUTER SCREEN

(76) Inventor: Jun Ho Yang, 6230 Wilshire Blvd. #1124, Los Angeles, CA (US) 90048

( * ) Notice: Subject to any disclaimer, the term of this patent is extended or adjusted under 35 U.S.C. 154(b) by 0 days.

(21) Appl. No.: 11/308,677

(22) Filed: Apr. 20, 2006

(65) Prior Publication Data
US 2007/0247792 A1 Oct. 25, 2007

(51) Int. Cl.
*H05K 7/00* (2006.01)
(52) U.S. Cl. .................. 361/681; 361/682; 248/920
(58) Field of Classification Search ............ 361/681, 361/682; 249/920
See application file for complete search history.

(56) References Cited

U.S. PATENT DOCUMENTS

| | | | |
|---|---|---|---|
| 6,222,507 B1 * | 4/2001 | Gouko | 345/1.1 |
| 6,859,219 B1 * | 2/2005 | Sall | 345/1.1 |
| 7,138,962 B2 * | 11/2006 | Koenig | 345/1.3 |
| 2006/0082518 A1 * | 4/2006 | Ram | 345/1.1 |

* cited by examiner

*Primary Examiner*—Lisa Lea-Edmonds
*Assistant Examiner*—Ingrid Wright
(74) *Attorney, Agent, or Firm*—Ivan Posey; Chan Law Group LLP

(57) ABSTRACT

A computer screen for a personal computer according to the present invention includes a main screen, one or more retractable sub-displays, and one or more retractable arms. The main screen has a main display and a docking space disposed behind the main display. The retractable sub-displays are adapted to be pushed in into and pulled out from the docking space of the main screen. The retractable arms, disposed in the docking space of the main display, are for holding the retractable sub-displays, for pulling in the retractable sub-displays into the docking space, for pushing out the retractable sub-displays from the docking space. The retractable arms are adapted to be tilted and twisted to accommodate the sight line of the viewers behind the main display.

17 Claims, 3 Drawing Sheets

COMPUTER SCREEN

BACKGROUND OF THE INVENTION

The present invention relates to a computer screen for a personal computer.

More particularly, this invention relates to a computer screen that deploys sub-displays other than a main display.

Also, the invention relates to a computer screen that enables the sub-displays to be tilted to and fro and to rotate, even to flip for a viewer behind the main display.

Computers are changing the face of the world not mentioning the life style of every single person. Thanks to the dramatic speed of development of the integrated circuit, computers crammed with a remarkable computing power and vast memory can be found casually on desks at home and work place.

One of the trends in personal computer community is larger and larger display commensurate to the increased computing power. Since the CPU can process a vast amount of information quickly and the memory and the hard disks can store and retrieve that vast amount of information easily, the computers must show the user more and more information somehow.

There are many ways to increase the display area: paging, virtual screen, simply larger display.

The portability is a key factor for the laptops and notebook computers, in which the choice of the measures for a larger display area cannot help being limited.

The present invention provides an easy and convenient solution to the problem.

Accordingly, a need for a computer screen with a larger display area has been present for a long time considering the drastic change of computing environment. This invention is directed to solve these problems and satisfy the long-felt need.

SUMMARY OF THE INVENTION

The present invention contrives to solve the disadvantages of the prior art.

An object of the invention is to provide a computer screen for a personal computer.

Another object of the invention is to provide an extra computer screen which can be deployed easily.

Still another object of the invention is to provide a computer screen that enables to show the displayed visual contents to a viewer behind the main display.

A computer screen for a personal computer according to the present invention includes a main screen, one or more retractable sub-displays, and one or more retractable arms.

The main screen has a main display and a docking space disposed behind the main display.

The retractable sub-displays are adapted to be pushed in into and pulled out from the docking space of the main screen.

The retractable arms, disposed in the docking space of the main display, are for holding the retractable sub-displays, for pulling in the retractable sub-displays into the docking space, for pushing out the retractable sub-displays from the docking space.

The main display displays the visual information from the personal computer in coordination with the retractable sub-displays.

The main display includes a LCD display. The retractable sub-displays include LCD displays.

The retractable sub-displays include a first retractable sub-display and a second retractable sub-display. The retractable sub-displays may further include a third sub-display.

The first retractable sub-display is deployed to the left side of the main display, and the second retractable sub-display deployed to the right side of the main display. The third retractable sub-display is deployed to the top side of the main display.

The retractable arm includes a first attaching portion, an extendable portion, a second attaching portion, and an articulated joint.

The first attaching portion is for attaching the retractable arm inside the docking space of the main screen.

The extendable portion is for traveling the retractable display in and out of the docking space of the main screen.

The second attaching portion is for attaching the retractable sub-display to the retractable arm.

The articulated joint, disposed between the extendable portion and the second attaching portion, is for tilting the retractable sub-display forward and backward and for twisting three hundred sixty degrees around the line through the horizontal center line of the retractable sub-display.

The retractable arm includes a plurality of electrical connections including a power line and a plurality of data wires, and the electrical connections are adapted to the unhindered retracting, tilting, and twisting movements of the retractable sub-screen.

The retractable sub-display further includes an operation switch. The operation switch is controlled by the retracting movement of the retractable sub-display or by a program switch provided by the personal computer.

The display direction (direction of sweeping) is controlled by the twisting movement of the retractable sub-display.

The displayed visual contents on the retractable sub-display are flipped horizontally and vertically to show the upright visual contents to a viewer behind the main screen.

The visual contents displayed on the main display and the retractable sub-displays are provided by the personal computer.

The retractable sub-displays display visual contents that are different from the main display.

The retractable sub-displays display the same visual contents as the main display.

In other embodiment of the present invention, a computer screen for a personal computer includes a) a main screen having a main display; and b) one or more retractable sub-displays adapted to be retracted behind the main screen and to be deployed around the main screen.

The main display displays the visual information from the personal computer in coordination with the retractable sub-displays. The sub-displays are adapted to be tilted to and fro and to be twisted about the horizontal axis of the main display. The horizontal and vertical sweeping directions of the visual contents are controlled by the twisting angle.

The main screen may include a docking space behind the main display, and the sub-displays are connected to the main screen with a sliding arm. The sliding arm includes an articulated joint for tilting and twisting the sub-displays.

Alternatively, the sub-displays are connected to the main screen with an articulated hinge. The articulated hinge is adapted for tilting and twisting the sub-displays. The sub-displays is folded behind the main screen when retracted.

The advantages of the present invention are: (1) the computer screen enables to expand the display area easily; (2) the computer screen can deploy the extra display area to three different directions; and (3) the sub-displays can be tilted and twisted to accommodate the sight line of the other viewers.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
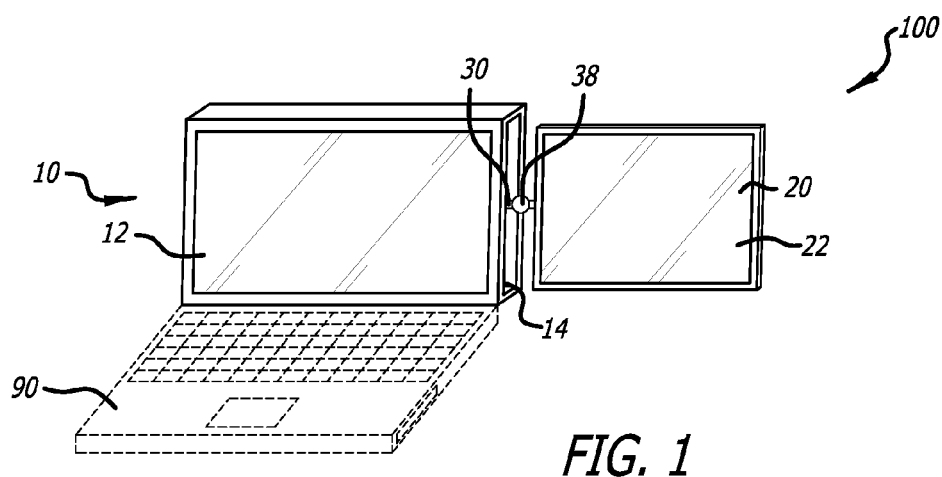
FIG. 1 is a perspective view of a computer screen with a first sub-display deployed.

FIGS. 1 through 5 show a computer screen 100 according to the present invention.

The computer screen 100 for a personal computer 90 according to the present invention includes a main screen 10, one or more retractable sub-displays 20, and one or more retractable arms 30.

The main screen 10 has a main display 12 and a docking space 14 disposed behind the main display 12.

The retractable sub-displays 20 are adapted to be pushed in into and pulled out from the docking space 14 of the main screen 10.

The retractable arms 30, disposed in the docking space 14 of the main display 12, are for holding the retractable sub-displays 20, for pulling in the retractable sub-displays 20 into the docking space 14, for pushing out the retractable sub-displays 20 from the docking space 14.

The main display 12 displays the visual information from the personal computer 90 in coordination with the retractable sub-displays 20.

The main display 12 includes a LCD display. The retractable sub-displays 20 include LCD displays.

The retractable sub-displays 20 include a first retractable sub-display 22 and a second retractable sub-display 24. The retractable sub-displays may further include a third sub-display 26.

Figure 3:
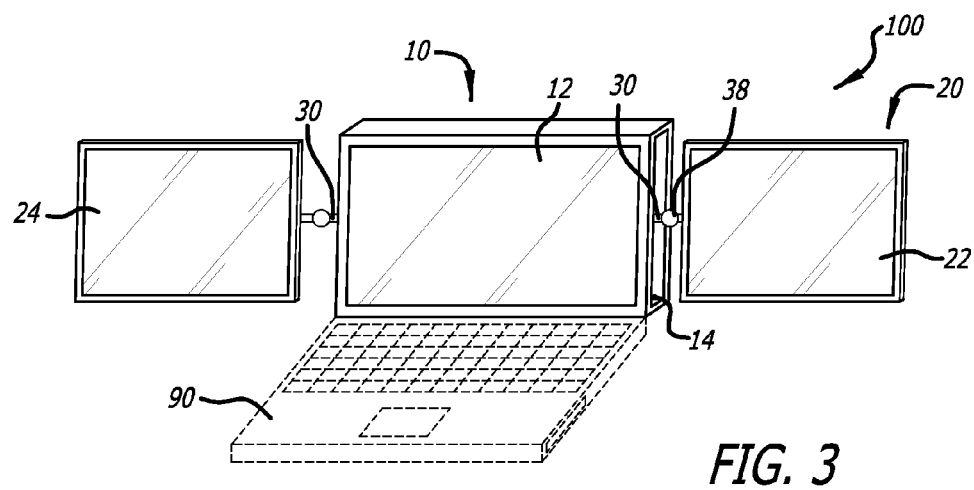
FIG. 3 is a perspective view of a computer screen with the first and second sub-displays deployed.
Figure 4:
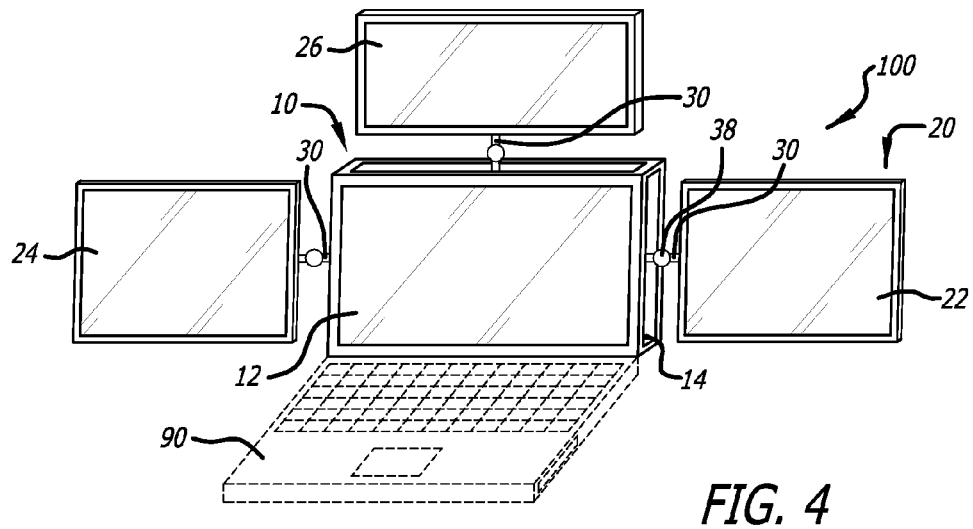
FIG. 4 is a perspective view of a computer screen with the first, second, and third sub-displays deployed.

The first retractable sub-display 22 is deployed to the left side of the main display 12, and the second retractable sub-display 24 is deployed to the right side of the main display 12. The third retractable sub-display 26 is deployed to the top side of the main display 12 as shown in FIG. 3 and FIG. 4.

The retractable arm 30 includes a first attaching portion 32, an extendable portion 34, a second attaching portion 36, and an articulated joint 38.

Figure 2:
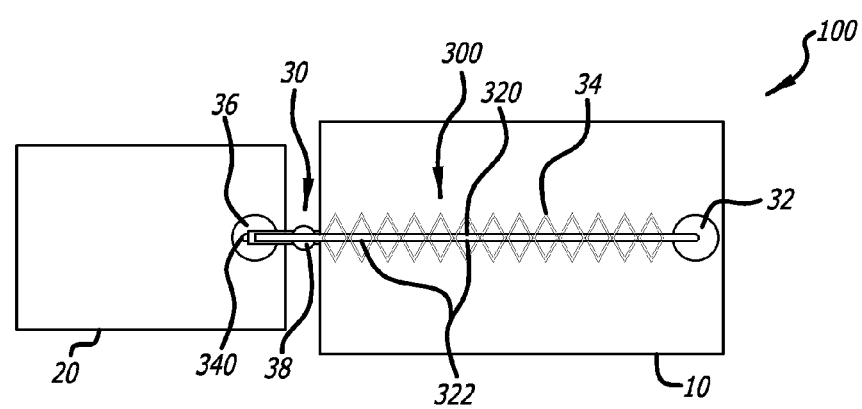
FIG. 2 is a rear plan view of FIG. 1.

The first attaching portion 32 is for attaching the retractable arm 30 inside the docking space 14 of the main screen 10 as shown in FIG. 2.

The extendable portion 34 is for traveling the retractable display 20 in and out of the docking space 14 of the main screen 10.

The second attaching portion 36 is for attaching the retractable sub-display 20 to the retractable arm 30.

Figure 5:
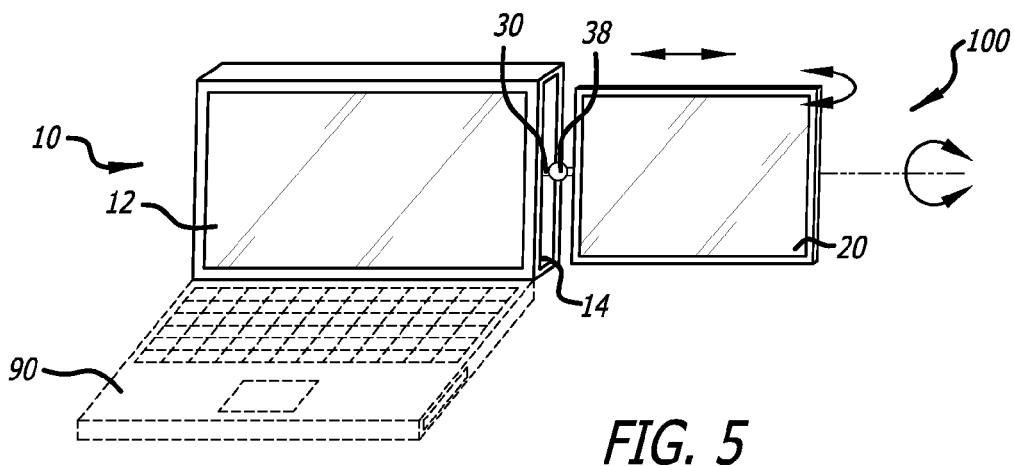
FIG. 5 is a perspective view showing the directions for the extracting, tilting, and twisting motion of the sub-display.

The articulated joint 38, disposed between the extendable portion 34 and the second attaching portion 36, is for tilting the retractable sub-display 20 forward and backward and for twisting three hundred sixty degrees around the line through the horizontal center line of the retractable sub-display 20 as shown in FIG. 5.

The retractable arm 30 includes a plurality of electrical connections 300 including a power line 320 and a plurality of data wires 322, and the electrical connections 300 are adapted to the unhindered retracting, tilting, and twisting motions of the retractable sub-displays 20.

The retractable sub-display 20 further includes an operation switch 340. The operation switch 340 is controlled by the retracting motion of the retractable sub-display 20 or by a program switch provided by the personal computer 90.

The display direction (direction of sweeping) is controlled by the twisting movement of the retractable sub-display 20.

The displayed visual contents on the retractable sub-displays 20 are flipped horizontally and vertically to show the upright visual contents to a viewer behind the main screen 10.

The visual contents displayed on the main display 12 and the retractable sub-displays 20 are provided by the personal computer 90.

The retractable sub-displays 20 display visual contents that are different from the main display 12.

The retractable sub-displays 20 display the same visual contents as the main display 12.

Figure 6:
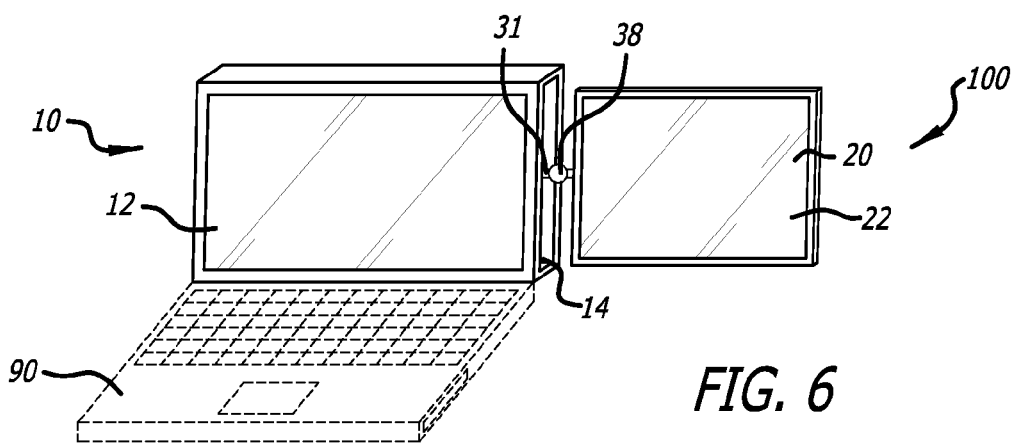
FIG. 6 is a perspective view of another embodiment of a computer screen with a sliding arm.

In other embodiment of the present invention as shown in FIG. 6, a computer screen 100 for a personal computer 90 includes a) a main screen 10 having a main display 12; and b) one or more retractable sub-displays 20 adapted to be retracted behind the main screen 10 and to be deployed around the main screen 10.

The main display 12 displays the visual information from the personal computer 90 in coordination with the retractable sub-displays 20. The sub-displays 20 are adapted to be tilted to and fro and to be twisted about the horizontal axis of the main display 12. The horizontal and vertical sweeping directions of the visual contents on the sub-displays 20 are controlled by the twisting angle.

The main screen may include a docking space 14 behind the main display 12, and the sub-displays 20 are connected to the main screen 10 with a sliding arm 31. The sliding arm 31 includes an articulated joint 38 for tilting and twisting the sub-displays 20. The sliding arm 31 may be integrated into the rear side of the main screen 10.

Figure 7:
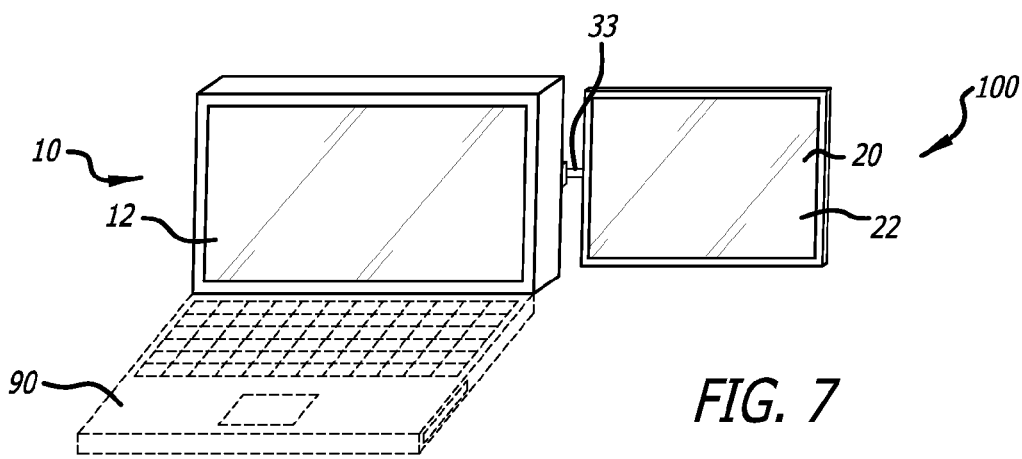
FIG. 7 us a perspective view of another embodiment of a computer screen with a sliding hinge.

Alternatively as shown in FIG. 7, the sub-displays 20 are connected to the main screen 10 with an articulated hinge 33. The articulated hinge 33 is adapted for tilting and twisting the sub-displays 20. The sub-displays 20 are folded onto the rear side of the main screen 10 when retracted. Or, the sub-displays 20 are twisted and then folded onto the main screen 10 in order to protect the sub-displays 20.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A computer screen for a personal computer comprising:
   a) a main screen having a main display and a docking space disposed behind the main display;
   b) one or more retractable sub-displays adapted to be pushed in into and pulled out from the docking space of the main screen; and
   c) one or more retractable arms each comprising an articulated joint, disposed in the docking space of the main display, for holding the retractable sub-displays, for pulling in the retractable sub-displays into the docking space, for pushing out the retractable sub-displays from the docking space, wherein the main display displays the visual information from the personal computer in coordination with the retractable sub-displays.

2. The computer screen of claim 1, wherein the main display comprises a LCD display, wherein the retractable sub-displays comprise LCD displays.

3. The computer screen of claim 1, wherein the retractable subdisplays comprise a first retractable sub-display deployed to the left of the main display.

4. The computer screen of claim 3, wherein the retractable sub-displays further comprise a second retractable sub-display deployed to the right side of the main display.

5. The computer screen of claim 3, wherein the retractable sub-displays further comprise a third retractable sub-display deployed to the top side of the main display.

6. The computer screen of claim 1, wherein the retractable displays comprise:
   a) a first retractable sub-display deployed to the left side of the main display; and
   b) a second retractable sub-display deployed to the right side of the main display.

7. The computer screen of claim 6, wherein the retractable sub-displays further comprise a third retractable sub-display deployed to the top side of the main display.

8. The computer screen of claim 1, wherein the retractable arm comprises:
   a) a first attaching portion for attaching the retractable arm inside the docking space of the main screen;
   b) an extendable portion for traveling the retractable display in and out of the docking space of the main screen; and
   c) a second attaching portion for attaching the retractable sub-display to the retractable arm;
   wherein the articulated joint is disposed between the extendable portion and the second attaching portion, for tilting the retractable sub-display forward and backward and for twisting three hundred sixty degrees around the line through the horizontal center line of the retractable sub-display.

9. The computer screen of claim 8, wherein the retractable arm comprises a plurality of electrical connections including a power line and a plurality of data wires, wherein the electrical connections are adapted to the unhindered retracting, tilting, and twisting movements of the retractable sub-screen.

10. The computer screen of claim 9, wherein the retractable sub-display further comprises an operation switch.

11. The computer screen of claim 8, further comprising an operation switch wherein the operation switch is controlled by the retracting movement of the retractable sub-display or by a program switch provided by the personal computer.

12. The computer screen of claim 8, wherein the display direction (direction of sweeping) is controlled by the twisting angle of the retractable sub-display.

13. The computer screen of claim 12, wherein the displayed visual contents on the retractable sub-display are flipped horizontally and vertically to show the upright visual contents to a viewer behind the main screen.

14. The computer screen of claim 1, wherein the visual contents displayed on the main display and the retractable sub-displays are provided by the personal computer.

15. The computer screen of claim 14, wherein the retractable sub-displays display visual contents that are different from the main display.

16. The computer screen of claim 14, wherein the retractable sub-displays display the same visual contents as the main display.

17. The computer screen of claim 1, wherein the personal computer comprises a desktop computer and a laptop computer.

* * * * *

UNITED STATES PATENT AND TRADEMARK OFFICE
CERTIFICATE OF CORRECTION

PATENT NO.        : 7,375,954 B2                                                Page 1 of 1
APPLICATION NO.   : 11/308677
DATED             : May 20, 2008
INVENTOR(S)       : Jun Ho Yang It is certified that error appears in the above-identified patent and that said Letters Patent is hereby corrected as shown below:

In the Claims

At column 5, line 22, in Claim 3, after "deployed to the left", insert -- side --.

At column 6, line 41, in Claim 17, replace "and" with -- or --.

Signed and Sealed this
Thirty-first Day of December, 2013

Margaret A. Focarino
*Commissioner for Patents of the United States Patent and Trademark Office*